United States Patent
Suzuki

(10) Patent No.: US 7,719,710 B2
(45) Date of Patent: May 18, 2010

(54) IMAGE FORMING SYSTEM

(75) Inventor: Koichiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1296 days.

(21) Appl. No.: 10/775,091

(22) Filed: Feb. 11, 2004

(65) Prior Publication Data
US 2004/0184097 A1 Sep. 23, 2004

(30) Foreign Application Priority Data
Feb. 18, 2003 (JP) ............... 2003-040144

(51) Int. Cl.
*G06K 15/00* (2006.01)
(52) U.S. Cl. .................. 358/1.16; 358/1.13
(58) Field of Classification Search ....... 358/1.11–1.15; 235/492; 186/61
See application file for complete search history.

(56) References Cited

U.S. PATENT DOCUMENTS

| | | | | |
|---|---|---|---|---|
| 5,042,619 A * | 8/1991 | Kohno | .................. | 186/61 |
| 6,466,329 B1 * | 10/2002 | Mukai | .................. | 358/1.15 |
| 2002/0109758 A1 | 8/2002 | Kono | .................. | 347/85 |
| 2002/0109856 A1 | 8/2002 | Sasanuma et al. | .................. | 358/1.9 |
| 2002/0170973 A1 * | 11/2002 | Teraura | .................. | 235/492 |
| 2003/0137689 A1 * | 7/2003 | Bontempi | .................. | 358/1.15 |

FOREIGN PATENT DOCUMENTS

JP 2001-105689 4/2001

* cited by examiner

*Primary Examiner*—Mark K Zimmerman
*Assistant Examiner*—Lennin R Rodriguez
(74) *Attorney, Agent, or Firm*—Fitzpatrick, Cella, Harper & Scinto

(57) ABSTRACT

An image forming system, which forms an image relating to subject data on a recording medium having a holding unit holding identification information specific to the storage medium, including: a detection unit which detects identification information held by the holding unit of an arbitrary recording medium on which an image is recorded; and a control unit which acquires subject data corresponding to the detected identification information and forms an image relating to the acquired subject data on the recording medium.

17 Claims, 7 Drawing Sheets

IMAGE FORMING SYSTEM

BACKGROUND OF THE INVENTION

1. Field of the Invention

The present invention relates to an image forming system, and in particular to management of print data using a radio frequency identification (RFID) chip having a specific ID.

2. Related Background Art

Conventionally, in order to copy a print, the print is scanned and an image of the print is copied on print paper using a copying machine or the like. In addition, in a case where the print is one printed by a printer, a file stored in a computer is retrieved to print the print anew. As exemplifying such a print system in which a computer and a printer are connected in this way, there is known a technique disclosed in Japanese Patent Application Laid-Open No. 2001-105689.

However, if the copying machine is used for the copy, naturally, the image quality of an image on a copied print may be deteriorated compared with that of the original print, or the image on the copied print may be inclined. In addition, in the case in which a print is printed by a printer, it takes a considerably long time to retrieve an original file for the print. Moreover, it is difficult to identify the original file if there are other files having similar contents.

SUMMARY OF THE INVENTION

It is an object of the present invention to solve the problems described above.

It is another object of the present invention to prevent image quality from being deteriorated in the copying of an image and to prevent a copied image from being inclined, and to reduce time and labor required for retrieval processing of copy subject data by a user.

In order to solve such problems, according to an aspect of the present invention, an image forming system includes:

image forming means that forms an image relating to subject data on a recording medium having holding means that holds identification information specific to the recording medium;

detecting means that detects the identification information held by the holding means of the recording medium;

database means that, in accordance with an image forming operation for an image relating to desired subject data by the image forming means, stores first identification information, which is detected by the detecting means from the holding means of a first recording medium on which the image relating to the desired subject data is recorded, and the desired subject data in association with each other;

retrieving means that retrieves subject data corresponding to second identification information detected by the detecting means from plural subject data stored in the database means at a timing independent from the image forming operation for the image relating to the desired subject data; and control means that controls, in accordance with a result of the retrieval by the retrieving means, the image forming means to form an image relating to the subject data corresponding to the second identification information retrieved by the retrieving means on a second recording medium different from the first recording medium.

Other objects and features of the present invention will be apparent form the following detailed description of the invention when considered in connection with the accompanying drawings.

DETAILED DESCRIPTION OF THE PREFERRED EMBODIMENTS

Figure 1:
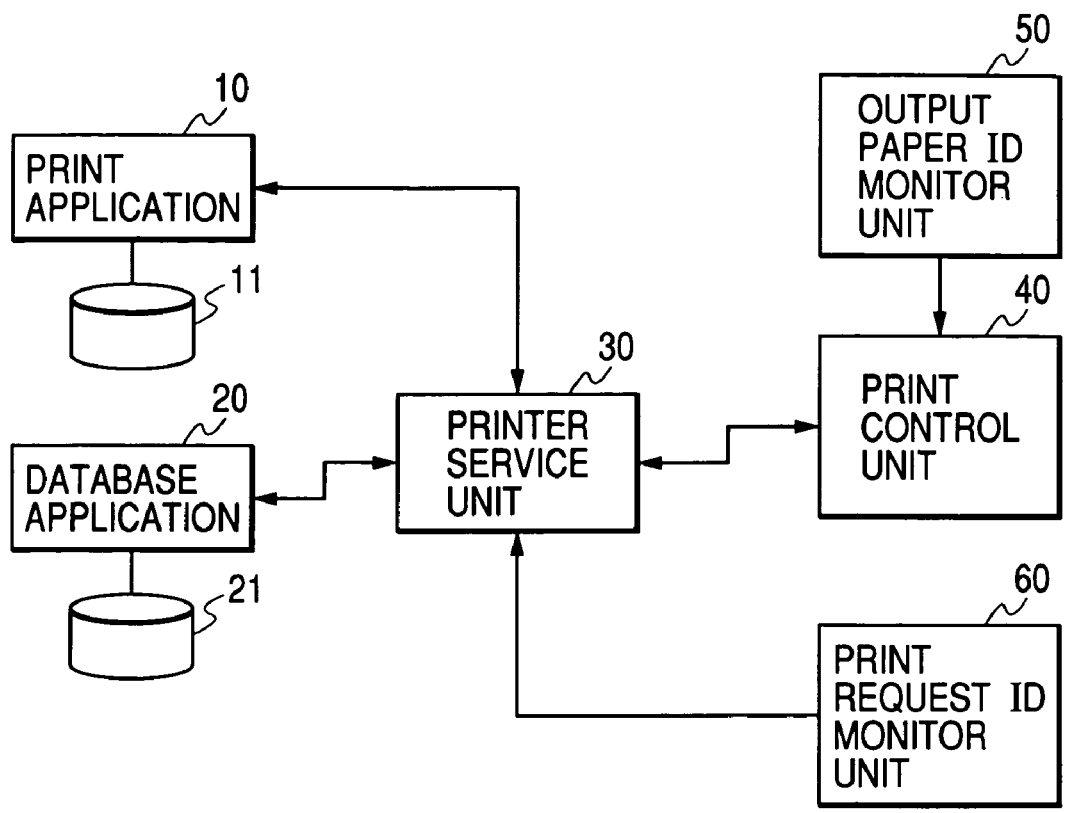
FIG. 1 is a block diagram schematically showing a main structure of an image forming system according to an embodiment of the present invention.

The preferred embodiments of the present invention will be hereinafter described in detail with reference to the accompanying drawings, in which like reference numerals refer to like parts.

FIG. 1 is a block diagram schematically showing a main structure of respective image forming systems according to first to fourth embodiments of the present invention. A user file 11 is a file of an image or a document which a user can use. A print application 10 is an application to be operated by the user and is provided for selection of a file to be printed from the user file 11. In addition, the print application 10 is provided with a function for converting the selected file into print data and delivering the print data to a printer service unit 30.

A database file 21 is a file in which print data and IDs of print paper are recorded in association with each other. A database application 20 includes a registration function, a reference function, and a deletion function. The registration function of the database application 20 allows registration of the print data and the IDs in a one-to-multiple relation. In other words, the registration function allows registration of plural IDs for one body of print data. By supplying an ID to the database application 20, the reference function of the database application 20 allows sending back of print data corresponding to the ID. By supplying an ID to the database application 20, the deletion function of the database application 20 allows deletion of print data corresponding to the ID.

A print control unit 40 is firmware which controls all operations relating to printing. An output paper ID monitor unit 50 is capable of: communicating with an RFID 80, which is attached to a print paper 90 which has just undergone printing shown in FIG. 6, in a non-contact manner with each other; always monitoring an output paper ID detector 70 (FIGS. 4 and 5), which reads out ID information specific to the RFID 80; and when the ID is detected, immediately informing the print control unit 40 of the ID.

A print request ID monitor unit 60 is capable of communicating with the RFID 80, which is attached to the print paper 90 on which an image which a user desires to copy is printed, in a non-contact manner with each other; always monitoring a print request ID detector 71 (FIG. 5), which reads out ID information specific to the RFID 80; and when the ID is detected, immediately informing a printer service unit 30 of the ID.

The printer service unit 30 is software which communicates with the print application 10, the database application 20, the print control unit 40, and the print request ID monitor unit 60 and controls operations of the entire system. The printer service unit 30 performs control of normal printing and extra copy printing.

Functions of the print application 10, the database application 20, and the printer service unit 30 can be realized by software using a computer as described later. The user file 11 and the database file 21 are accumulated in a storage unit such as a hard disk drive in a computer as described later and are used when executing the respective applications.

Here, operation for normal printing will be described. The user executes the print application 10, selects a file which the user desires to print from the user file 11, and instructs the print application 10 to print the file. When the printing instruction is received, the print application 10 reads out the designated user file 11, converts the user file 11 into print data, and delivers the print data to the printer service unit 30.

The printer service unit 30 transfers the delivered print data to the print control unit 40. The print control unit 40 creates a bitmap image on the basis of the transferred print data and controls a print mechanism of a printer 200 in FIG. 2, described later, to print the bitmap image on the print paper 90. In parallel with this print operation, the ID of the print paper 90 to be outputted is monitored through the output paper ID monitor unit 50.

The output paper ID monitor unit 50 monitors an output signal of the output paper ID detector 70 and, when the print paper 90 passes, detects the ID of the paper. When the ID information is detected, the output paper ID monitor unit 50 informs the print control unit 40 of the ID information. When the printing is completed, the print control unit 40 informs the printer service unit 30 of the completion of the printing together with the ID information informed from the output paper ID monitor unit 50.

The printer service unit 30 informs the database application 20 of the ID information informed from the print control unit 40 together with the print data. The database application 20 registers the informed print data and ID information in the database file 21 in association with each other. Then, when the registration of the print data and the ID information in the database file 21 is completed, the printer service unit 30 informs the print application 10 of the completion of the print operation based upon the delivered print data. When the notification of the completion of the print operation is received from the printer service unit 30, the print application 10 informs the user of completion of the printing.

Next, an operation for extra copy printing will be described.

A user brings an RFID part of the print paper 90, on which an image for which the user desires to print extra copies is printed, close to the print request ID detector (FIG. 4) 71, and causes the print request ID detector 71 to read the ID. The print request ID detector 71 informs the printer service unit 30 of the ID information. The printer service unit 30 sends the informed ID information to the database application 20 and instructs the database application 20 to retrieve print data corresponding to this ID information from the database file 21.

The database application 20 retrieves the registered database file 21. If the print data corresponding to this ID information exists, the database application 20 sends the related print data to the printer service unit 30. If the print data does not exist, the database application 20 returns information indicating failure of retrieval to the printer service unit 30. If the print data is sent back from the database application 20, the printer service unit 30 transfers the print data to the print control unit 40.

The print control unit 40 creates a bitmap image on the basis of the transferred print data and controls the print mechanism of the printer 200 to execute printing on the print paper 90. In parallel with this print operation, the ID of the print paper 90 to be outputted is monitored through the output paper ID monitor unit 50. When the ID is detected, the output paper ID monitor unit 50 informs the print control unit 40 of the ID information.

When the printing is completed, the print control unit 40 informs the printer service unit 30 of the completion of the printing together with the ID information informed from the output paper ID monitor unit 50. The printer service unit 30 sends the ID information informed from the print control unit 40 to the database application 20. The database application 20 registers the print data, for which extra copies have been printed, and the informed ID information in the database file 21 in association with each other.

In other words, every time one image of print data registered in the database file 21 is printed, ID information for the print data is registered anew.

Figure 2:
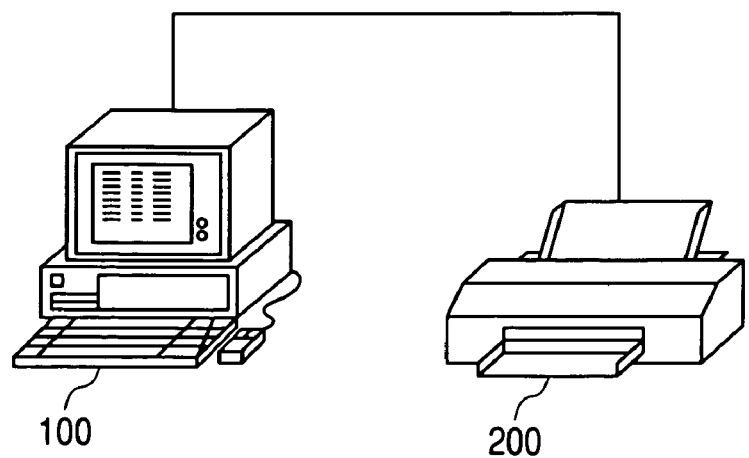
FIG. 2 is an external view of the image forming system according to the embodiment of FIG. 1.
Figure 3:
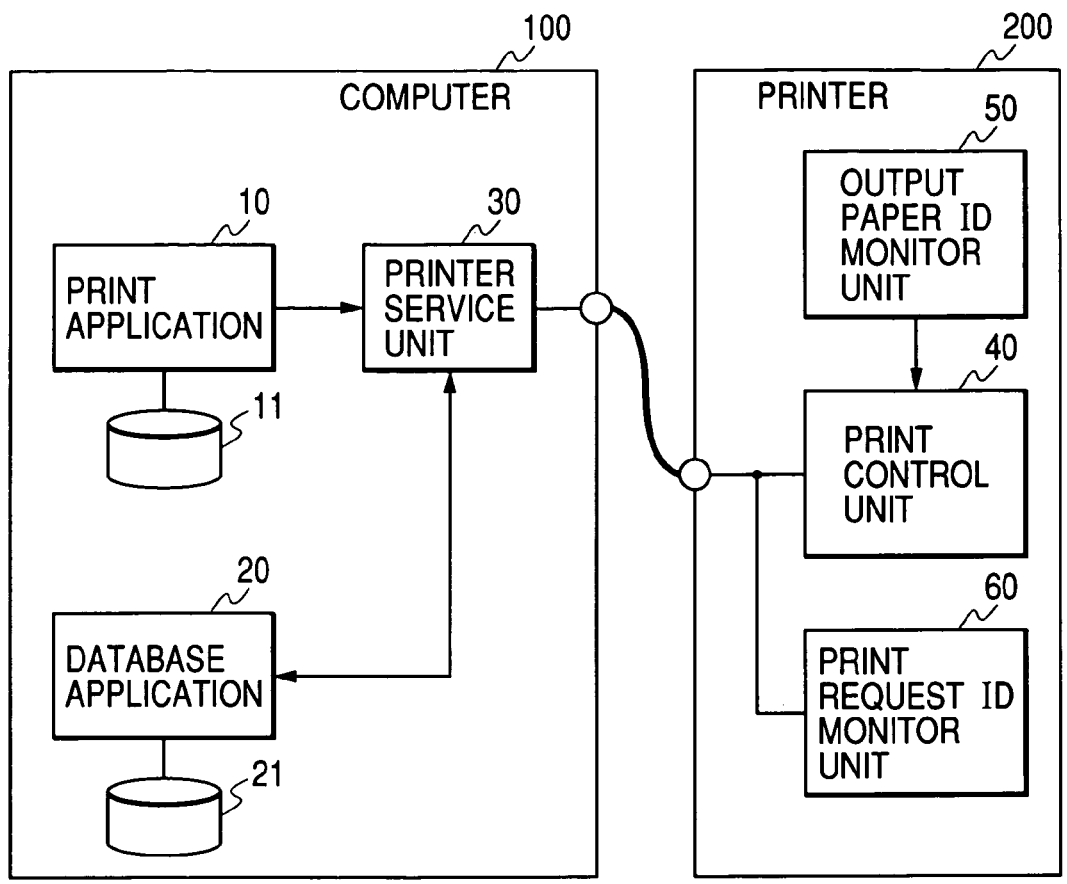
FIG. 3 is a block diagram schematically showing an internal structure of the image forming system according to the embodiment of FIG. 1.

FIG. 2 shows an external view of the image forming system according to the first embodiment of the present invention. FIG. 3 is a block diagram schematically showing an internal structure of the image forming system according to this embodiment.

As shown in FIG. 3, the functions of the print application 10, the user file 11, the database application 20, the database file 21, and the printer service unit 30 are included in a computer 100, and the functions of the print control unit 40, the output paper ID monitor unit 50, and the print request ID monitor unit 60 are included in the printer 200. The computer 100 and the printer 200 are connected via a network.

The user file 11 and the database file 21 are saved in a hard disk in the computer 100.

Figure 4:
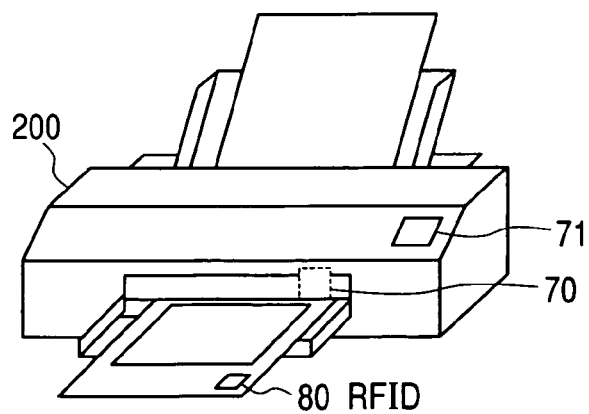
FIG. 4 is an external view of a printer.

FIG. 4 is an external view of the printer 200.

In the printer 200, paper is fed from the back of a main body thereof and discharged from the front of the main body after printing. In a course of the printing, specific ID information incorporated in the RFID 80 attached to the print paper 90 is read by the output paper ID detector 70. In addition, the print request ID detector 71 is provided in the upper front part of the main body separately from the output paper ID detector 70. When the part of the printed print paper 90 where the RFID 80 is attached is brought close to the upper front part of the main body, the specific ID incorporated in the RFID 80 of the printed print paper 90 is read by the print request ID detector 71.

The output paper ID monitor unit 50 includes the output paper ID detector 70, and the print request ID monitor unit 60 includes the print request ID detector 71.

Figure 5:
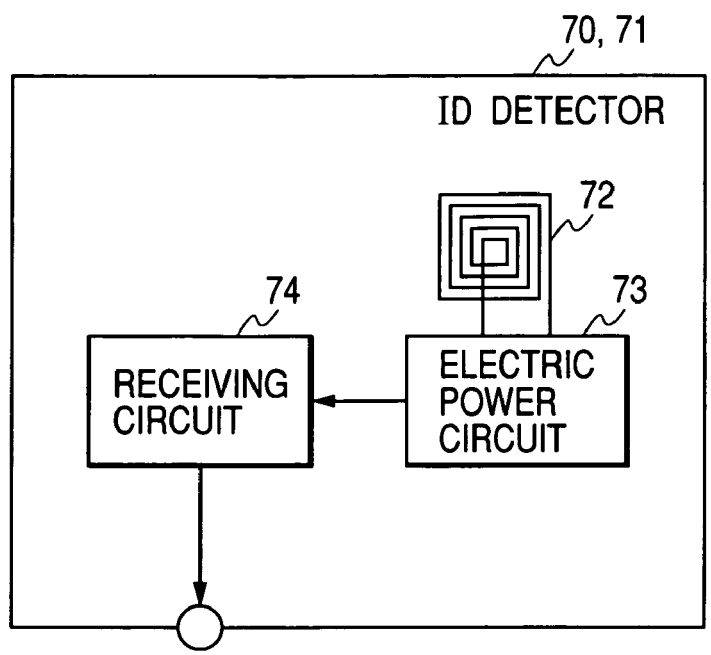
FIG. 5 is a block diagram showing an internal structure of an output paper ID detector and a print request ID detector.

FIG. 5 is a block diagram showing an internal structure of the output paper ID detector 70 and the print request ID detector 71.

The output paper ID detector 70 and the print request ID detector 71 each include an antenna 72, an electric power circuit 73, and a receiving circuit 74. The electric power circuit 73 causes a high-frequency current to flow to the antenna 72 connected to the electric power circuit 73. In other words, the electric power circuit 73 supplies electric power to the antenna 72. At this point, the amplitude of the high-frequency current to be supplied to the antenna 72 is controlled to be constant. In addition, the electric power circuit 73 detects the high-frequency current and sends a signal of the high-frequency current to the receiving circuit 74. The receiving circuit 74 restores ID information according to a change in the signal based upon the high-frequency current from the electric power circuit 73. The output paper ID detector 70 and the print request ID detector 71 each output the ID information restored by the receiving circuit 74.

Figure 6:
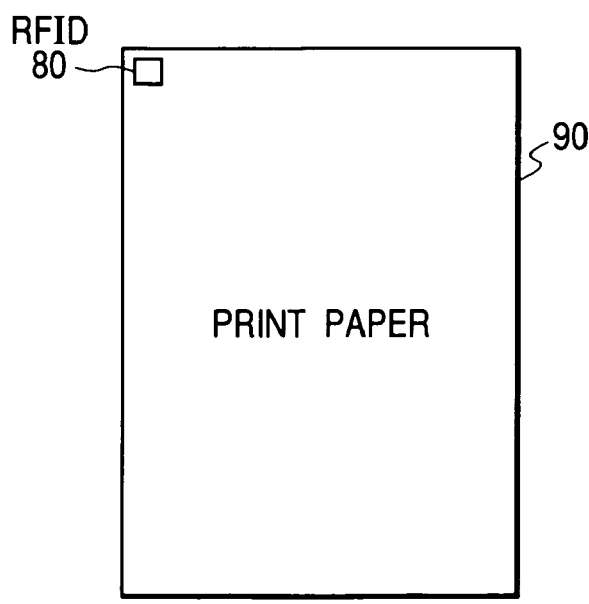
FIG. 6 is an external view of a print paper.
Figure 7:
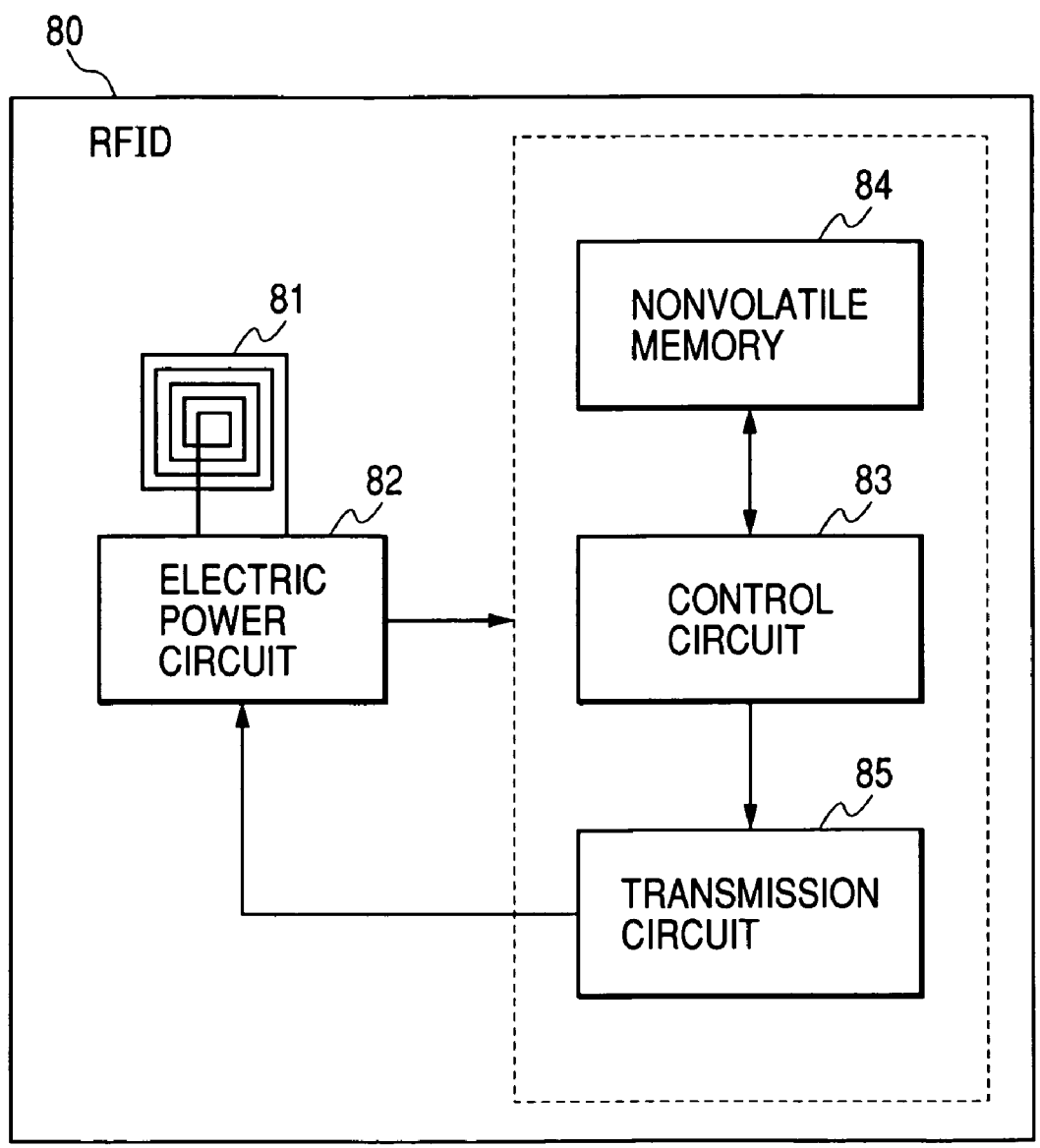
FIG. 7 is a block diagram showing an internal structure of an RFID.

FIG. 6 is an external view of the print paper 90. As shown in FIG. 6, the RFID 80 is attached to an upper left portion of the print paper 90. FIG. 7 is a block diagram showing the internal structure of the RFID 80.

As shown in FIG. 7, the RFID 80 includes an antenna 81, an electric power circuit 82, a control circuit 83, a nonvolatile memory 84, and a transmission circuit 85. The electric power circuit 82 receives high-frequency power, which is supplied from the output paper ID detector 70 and the print request ID detector 71, through the antenna 81. Subsequently, after rectifying the received high-frequency power, the electric power circuit 82 supplies the power to the control circuit 83, the nonvolatile memory 84, and the transmission circuit 85.

When the power is supplied, the control circuit 83 reads out specific ID information in the nonvolatile memory 84 after elapse of a predetermined time and converts the ID information into serial data. The transmission circuit 85 supplies a modulation signal to the electric power circuit 82 in accordance with the serial data converted from the ID information in the control circuit 83. The electric power circuit 82 varies its amount of power consumption in response to the modulation signal from the transmission circuit 85. This variation in power consumption is sent to the output paper ID detector 70 or the print request ID detector 71 through the antenna 81. Consequently, the output paper ID detector 70 and the print request ID detector 71 can obtain the ID information of the RFID 80.

In this manner, according to the present embodiment, in the case where the user desires to record an image, which is already printed once, on another recording paper again, the user can print the desired image anew with a simple operation of causing the printer 200 to read the RFID attached to the recording paper on which the desired image is printed.

Therefore, it is unnecessary to retrieve desired image data from the user file 11 of the computer 100.

Figure 8:
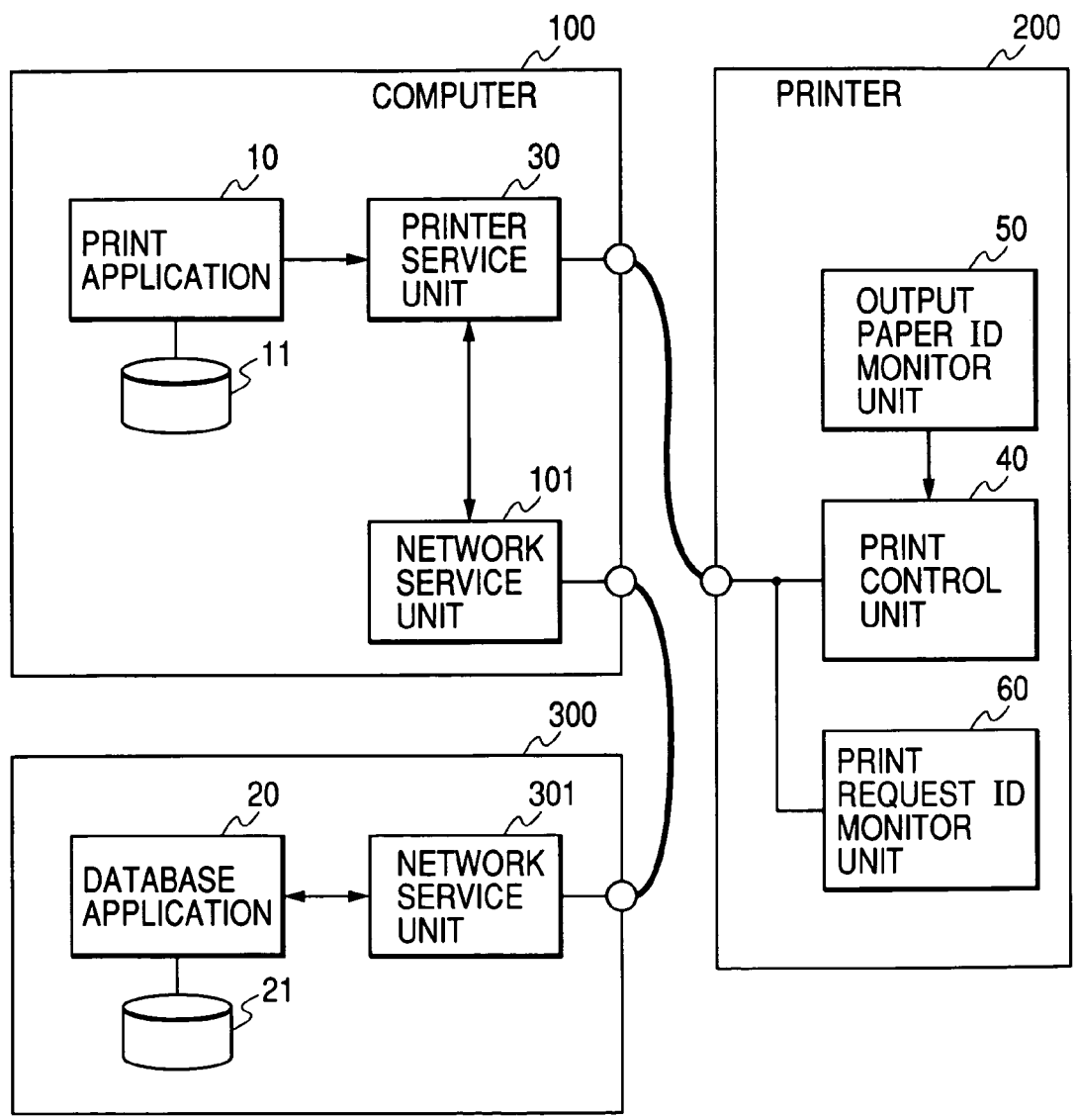
FIG. 8 is a block diagram showing a structure of an image forming system according to another embodiment of the present invention.

FIG. 8 is a block diagram showing the structure of the image forming system according to the second embodiment of the present invention. In the image forming system of the present embodiment, the component relating to the database is arranged on a network, which differs from the image forming system in the first embodiment. In other words, in the image forming system of the present embodiment, unlike the structure shown in FIG. 3, the database application 20 and the database file 21 are arranged in a computer 300 separate from the computer 100, in which the print application 10 and the printer service unit 30 are provided, and the computer 100 and the computer 300 are connected via a network. Accordingly, both computers 100 and 300 are provided with network service units 101 and 301, respectively.

In addition, the computer 100 including the printer service unit 30, is also connected to the printer 200 including the print request ID detector 71 and the like via a network. If ID information detected by the print request ID detector 71 is sent to the database application 20 from the printer 200 through the computer 100, it is possible to execute printing of a file corresponding to the ID information as described above.

Figure 9:
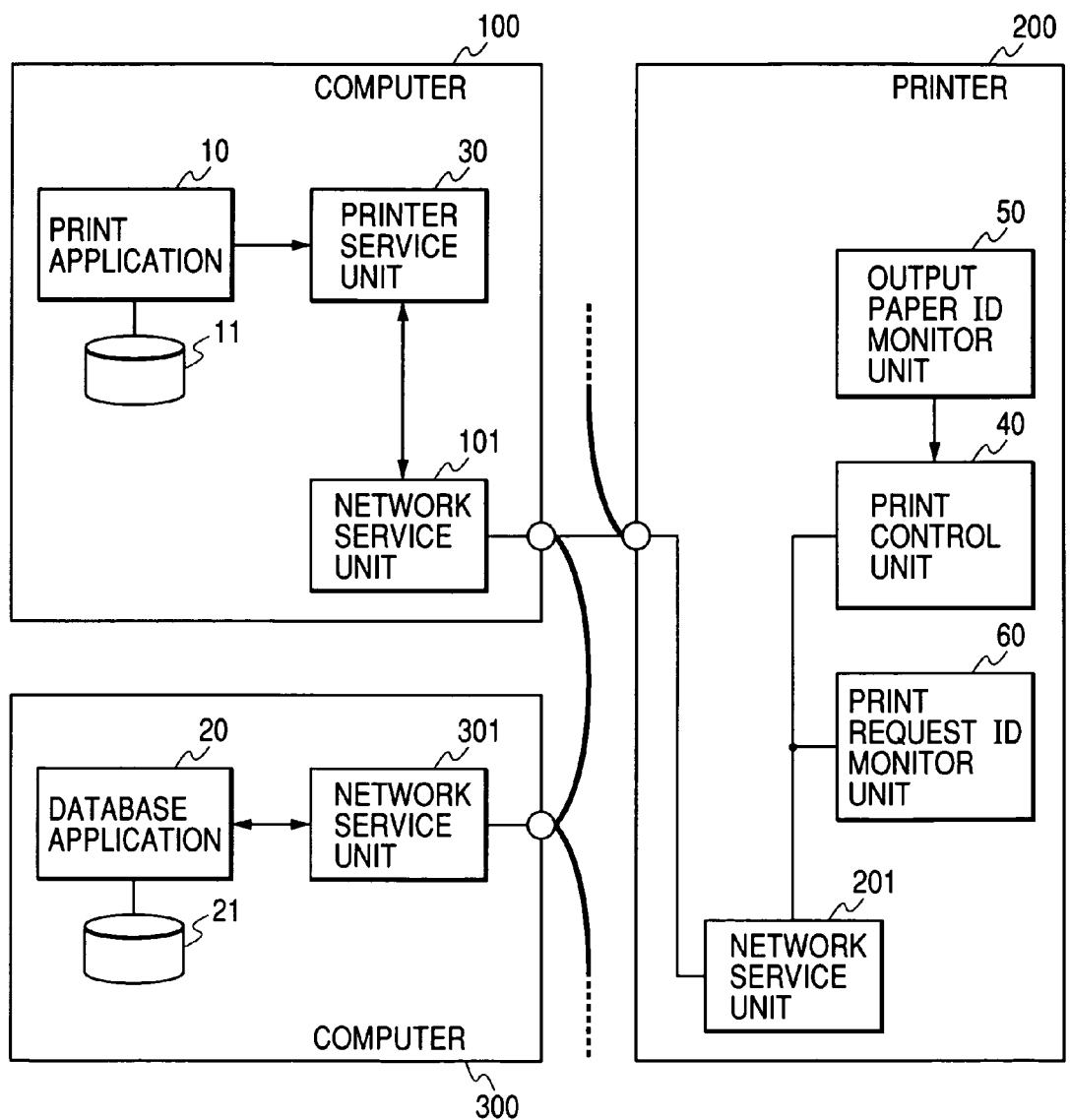
FIG. 9 is a block diagram showing a structure of an image forming system according to a third embodiment of the present invention.
Figure 10:
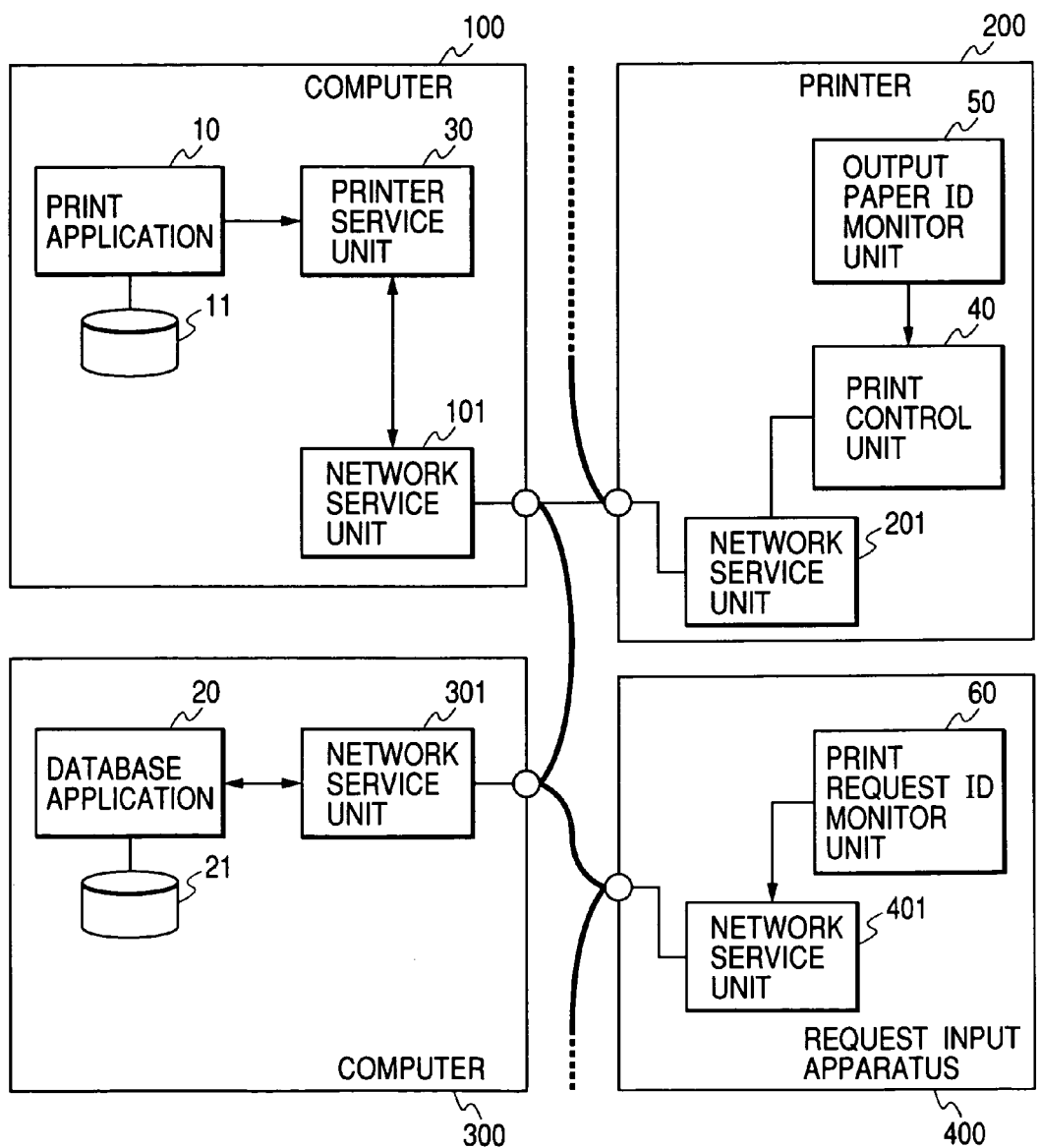
FIG. 10 is a block diagram showing a structure of an image forming system according to a further embodiment of the present invention.

FIGS. 9 and 10 are block diagrams showing structures of the image forming systems according to the third embodiment and the fourth embodiment of the present invention, respectively.

The structure of the image forming system in the third embodiment of the present invention is different from the structure of the image forming system shown in FIG. 8 in that the printer 200 and the computer 100 are connected via a network.

In addition, the structure of the image forming system according to the forth embodiment of the present invention is different from the structure of the image forming system shown in FIG. 8 in that the print request ID monitor unit 60 is separated from the printer 200, a request input apparatus 400 including the print request ID monitor unit 60 is provided anew, and the request input apparatus 400 and the computer 300 are connected via a network. Accordingly, computers 100 and 300, printer 200 and request input apparatus 400 are provided with network service units 101, 301, 201 and 401, respectively.

It is needless to mention that the image forming system shown in FIG. 9 or FIG. 10 realizes the same actions and effects as the image forming systems shown in FIGS. 3 and 8.

The present invention is not limited to the structures described in the first to fourth embodiments, and it is possible to arrange every part of the block components shown in FIG. 3 on a network. In addition, a system configuration may be adopted in which the respective block components shown in FIG. 3 may be arranged on a network in plural.

According to the above-mentioned embodiments, in order to copy a print, an RFID part of the print, which a user desires to copy, is made to react to an ID detection unit of a printer or an independent ID detector to recognize print contents from ID information of the print to thereby print the print contents.

Therefore, an image quality of an image on a copied print is never deteriorated compared with that on an original print and the image on the copied print is not inclined. In addition, it is unnecessary to retrieve an original file of an image which a user desires to copy. Further, it is also possible to collectively manage documents according to a history of copying in a database.

Furthermore, although depending upon a structure of a printer to which the image forming system of the present invention is applied, it is also possible to adopt a single ID detector, which has both the functions of the output paper ID detector 70 and the print request ID detector 71, as alternative means. Moreover, according to the above-mentioned embodiments, print data and IDs of print paper are recorded in association with each other in the database file 21. However, the present invention can further register other information on the print data.

Examples of the other information on the print data include an ID of a computer which executes print processing and an ID of application software which is controlled the print processing in the computer.

When the print processing is executed by a user once, the information on the print data and the print data are registered in association with each other in the database file 21. In the case in which the user desires to copy this print data later, the user inputs the IDs of the computer and the application software using input means such as a keyboard. The database application 20 retrieves print data corresponding to the inputted information from the database file 20 and informs the printer service unit 30 of a result of the retrieval. In the case in which the print data is returned from the database application 20, the printer service unit 30 transfers the print data to the pertinent application software and causes the pertinent computer to execute print processing.

In addition, it is also possible to incorporate the database application 20 and the database file 21 in the printer 200. In this case, it is possible to copy a print on the basis of the printing method unique to the present invention with the printer 200 alone.

Moreover, when a print is copied, in addition to an ID of print paper on which an image to be copied is printed, an ID of print paper on which the image is copied is also registered in association with the pertinent print data in the database file 21, whereby it is possible to copy the print data using any one of those kinds of print paper from then on.

Note that, in the present invention, a size of print paper is not limited, and the present invention is applicable to print paper of any size. In addition, print data is not limited to image data, and the present invention is applied to text data or the like.

In addition, the objects of the present invention are also attained by providing a storage medium having stored therein program code of software, which realizes the functions of the above-mentioned embodiments, to a system or an apparatus, and by causing a computer (or a CPU or an MPU) of the system or the apparatus to read out and execute the program code stored in the storage medium.

In this case, the program code itself read out from the storage medium realizes the functions of the above-mentioned embodiments, and the program code itself and the storage medium having stored therein the program code constitute the present invention.

As the storage medium for supplying the program code, for example, a flexible disk, a hard disk, an optical disk, a magneto-optical disk, a CD-ROM, a CD-R, a magnetic tape, a nonvolatile memory card, a ROM, or the like can be used.

In addition, the present invention includes not only the case in which the functions of the above-mentioned embodiments are executed by causing the computer to execute the read-out program code, but also a case in which an OS (a basic system or an operating system) or the like running on the computer performs actual processing partly or entirely on the basis of an instruction of the program code, realizing the functions of the above-mentioned embodiments by the processing.

Moreover, the present invention also includes a case in which, after the program code read out from the storage medium is written in a memory provided in a function extending board inserted in the computer or a function extending unit connected to the computer, a CPU or the like provided in the function extending board or the function extending unit performs actual processing partly or entirely, thereby realizing the functions of the above-mentioned embodiments by the processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming system comprising:
   image forming means that, in accordance with an image forming instruction, forms an image relating to subject data on a recording medium provided thereon with an RFID tag that stores identification information specific to the recording medium;
   detecting means that communicates with the RFID tag of the recording medium by radio frequency communication and reads the identification information from the RFID tag of the recording medium;
   database means that, in accordance with the image forming instruction, obtains the identification information read by said detecting means from the RFID tag of the recording medium and forms a database of the subject data along with the obtained identification information, wherein,
   when the image relating to the subject data is formed on a first recording medium provided thereon with an RFID tag by said image forming means in accordance with an image forming instruction, said database means obtains first identification information read by said detecting means from the RFID tag of the first recording medium and stores the first identification information and the subject data in association with each other in the database, and
   when the image relating to the subject data is formed on a second recording medium provided thereon with an RFID tag by said image forming means in accordance an the image forming instruction, said database means obtains second identification information read by said detecting means from the RFID tag of the second recording medium and stores the second identification information in association with the subject data in the database;
   retrieving means that detects the subject data from the database corresponding to the identification information of the recording medium read by said detecting means, at a timing later than when the image relating to the subject data is formed on the recording medium; and
   control means that controls said image forming means to form an image relating to the subject data detected by said retrieving means on a recording medium provided thereon with an RFID tag, said detecting means to read identification information from the RFID tag, and said database means to store the identification information in the database.

2. A system according to claim 1, further comprising:
   selecting means that is capable of selecting the subject data from plural subject data stored by storing means.

3. A system according to claim 2, wherein at least a part of said image forming means, detecting means, storing means, selecting means, database means, and retrieving means are connected via a network.

4. A system according to claim 1, wherein said detecting means includes a first detection unit for reading the identification information from the RFID tag of the recording medium in accordance with an image forming operation by the image forming means and a second detection unit for reading the identification information from the RFID tag of the recording medium at a timing different from the image forming operation by the image forming means, and
   the first detection unit is provided in the vicinity of a moving path of the recording medium in the image forming operation, and the second detection unit is provided at a position where the second detection unit can read out the identification information in the case where the recording medium is brought close to the image forming means.

5. A system according to claim 1, wherein the subject data includes image data.

6. A system according to claim 1, wherein at least one of said image forming means, detecting means, database means, and retrieving means is connected via a network.

7. A system according to claim 1, wherein said database means further stores additional information, which is related to an image forming operation of the image of the subject data, in association with the subject data, and said retrieving means retrieves the subject data corresponding to the additional information in the case where information identical with the additional information is inputted at a timing independent from the image forming operation.

8. A system according to claim 7, wherein the additional information includes identification information of an apparatus and application software which executed the image forming operation for the image of the subject data.

9. An image forming method for an image forming system, comprising the steps of:
   in accordance with an image forming instruction, forming an image relating to subject data on a recording medium provided thereon with an RFID tag that stores identification information specific to the recording medium;
   communicating with the RFID tag of the recording medium by radio frequency communication and reading the identification information from the RFID tag of the recording medium;
   in accordance with the image forming instruction, obtaining the identification information read in said reading step from the RFID tag of the recording medium and forming a database of the subject data along with the identification information, wherein,
      when the image relating to the subject data is formed on a first recording medium provided thereon with an RFID tag in said image forming step in accordance with an image forming instruction, said database forming step includes obtaining first identification information read in said reading step from the RFID tag of the first recording medium and storing the first identification information and the subject data in association with each other in the database, and
      when the image relating to the subject data is formed on a second recording medium provided thereon with an RFID tag in said image forming step in accordance with an image forming instruction, said database forming step includes obtaining second identification information read in said detecting step from the RFID tag of the second recording medium and storing the second identification information in association with the subject data in the database;
   detecting the data from the database corresponding to the identification information of the recording medium read in said communicating and reading step, at a timing later than when the image relating to the subject data is formed on the recording medium; and
   controlling said image forming step to form an image relating to the subject data detected in said retrieving step on a recording medium provided thereon with an RFID tag, said detecting step to read identification information from the RFID tag, and said database forming step to store the identification information in the database.

10. A method according to claim 9, further comprising the steps of:
   selecting the subject data from plural subject data stored in said subject data storing step.

11. A method according to claim 10, wherein at least one of said image forming step, detecting step, subject data step, selecting step, identification information storing step, and retrieving step is executed via a network.

12. A method according to claim 9, wherein said detecting step includes a first detection step of detecting the first identification information and a second detection step of detecting the second identification information, and
   the first detection step is executed by a first detection unit provided in the vicinity of a moving path of the recording medium following an image forming operation, and the second detection step is executed by a second detection unit provided at a position where the second detection unit can read out the second identification information in the case where the recording medium is brought close to the image forming means.

13. A method according to claim 9, wherein the subject data includes image data.

14. A method according to claim 9, wherein at least one of said image forming step, detecting step, identification information storing step, and retrieving step is executed via a network.

15. A method according to claim 9, wherein said identification information storing step includes storing additional information, which is related to an image forming operation for the image of the subject data, in association with the subject data, and
   said retrieving step further includes retrieving the subject data corresponding to the additional information in the case where information identical with the additional information is inputted at a timing independent from the image forming operation.

16. A method according to claim 15, wherein the additional information includes identification information of an apparatus and application software which executed the image forming operation for the image of the subject data.

17. An image forming system comprising:
   an image forming unit configured to, in accordance with an image forming instruction, form an image relating to subject data on a recording medium provided thereon with an RFID tag that stores identification information specific to the recording medium;
   a detecting unit configured to communicate with the RFID tag of the recording medium by radio frequency communication and read the identification information from the RFID tag of the recording medium;
   a database unit configured to, in accordance with the image forming instruction, obtain the identification information read by said detecting unit from the RFID tag of the recording medium and form a database of the subject data along with the obtained identification information, wherein,
      when an image relating to the subject data is formed on a first recording medium provided thereon with an RFID tag by said image forming unit in accordance with an image forming instruction, said database unit obtains first identification information read by said detecting unit from the RFID tag of the first recording medium and stores the first identification information and the subject data in association with each other in the database, and
      when the image relating to the subject data is formed on a second recording medium provided thereon with an RFID tag by said image forming unit in accordance with an image forming instruction, said database unit obtains second identification information read by said detecting unit from the RFID tag of the second recording medium and stores the second identification information in association with the subject data in the database;
   a retrieving unit configured to detect the subject data from the database corresponding to the identification information of the recording medium read by said detecting unit at a timing later than when the image relating to the subject data is formed on the recording medium; and
   a control unit configured to control said image forming unit to form an image relating to the subject data detected by said retrieving unit on a recording medium provided thereon with an RFID tag, said detecting unit to read identification information form the RFID tag, and said database unit to store the identification information in the database.

* * * * *